US011431040B2

(12) United States Patent
Tomar et al.

(10) Patent No.: US 11,431,040 B2
(45) Date of Patent: Aug. 30, 2022

(54) ARRANGEMENT FOR LITHIUM-ION BATTERY THERMAL EVENTS PREDICTION, PREVENTION, AND CONTROL

(71) Applicant: Purdue Research Foundation, West Lafayette, IN (US)

(72) Inventors: Vikas Tomar, West Lafayette, IN (US); Bing Li, West Lafayette, IN (US); Vilas G. Pol, West Lafayette, IN (US); Ryan Andrew Adams, Redwood City, CA (US); Mihit Hitendra Parekh, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 293 days.

(21) Appl. No.: 16/557,954

(22) Filed: Aug. 30, 2019

(65) Prior Publication Data
US 2021/0057786 A1    Feb. 25, 2021

Related U.S. Application Data

(60) Provisional application No. 62/726,140, filed on Aug. 31, 2018.

(51) Int. Cl.
*H01M 10/48* (2006.01)
*H01M 4/66* (2006.01)
*H01M 4/525* (2010.01)
*H01M 4/38* (2006.01)
*H01M 50/411* (2021.01)

(52) U.S. Cl.
CPC ......... *H01M 10/486* (2013.01); *H01M 4/382* (2013.01); *H01M 4/525* (2013.01); *H01M 4/662* (2013.01); *H01M 50/411* (2021.01)

(58) Field of Classification Search
None
See application file for complete search history.

(56) References Cited

U.S. PATENT DOCUMENTS

| | | | | |
|---|---|---|---|---|
| 6,093,503 A * | 7/2000 | Isoyama | ............. | H01M 50/581 429/231.95 |
| 9,190,643 B2 * | 11/2015 | Lee | .................... | H01M 50/209 |
| 2004/0214082 A1 * | 10/2004 | Inatomi | ................. | H01M 4/137 429/213 |
| 2009/0023059 A1 * | 1/2009 | Kinoshita | ........... | H01M 50/293 180/68.5 |
| 2012/0189917 A1 * | 7/2012 | Heusser-Nieweg | ......................... | H01M 50/414 429/247 |
| 2013/0164569 A1 * | 6/2013 | Srinivasan | ............ | H01M 50/20 429/7 |
| 2013/0224564 A1 * | 8/2013 | Kim | .................... | H01M 10/482 429/158 |
| 2014/0170472 A1 * | 6/2014 | Hattori | ................ | H01M 50/171 429/174 |
| 2017/0214256 A1 * | 7/2017 | Hardy | ..................... | B60L 58/22 |
| 2018/0151918 A1 * | 5/2018 | Boovaragavan | .. | H01M 10/4257 |

OTHER PUBLICATIONS

Li et al., Examining temporal and spatial variations of internal temperature in large-format laminated battery with embedded thermocouples, Journal of Power Sources, vol. 241,2013,pp. 536-553, 2013.
Zhang et al., Rapid self-heating and internal temperature sensing of lithium-ion batteries at low temperatures, Electrochimica Acta,vol. 218,2016,pp. 149-155, 2016.
Novais et al., Internal and External Temperature Monitoring of a Li-Ion Battery with Fiber Bragg Grating Sensors Sensors, vol. 16, p. 1394, 2016.
Zhang et al., Reaction temperature sensing (RTS)-based control for Li-ion battery safety, Scientific Report, vol. 5, p. 18237, 2015.
Wang et al., Real-time monitoring of internal temperature evolution of the lithium-ion coin cell battery during the charge and discharge process, Extreme Mechanics Letters, vol. 9, Part 3, pp. 459-466, 2016.
Lee et al., In Situ Monitoring of Temperature inside Lithium-Ion Batteries by Flexible Micro Temperature Sensors, Sensors, 11(10), 9942-9950, 2011.
Le et al., A Flexible Three-in-One Microsensor for Real-Time Monitoring of Internal Temperature, Voltage and Current of Lithium Batteries, Sensors, 15(5), 11485-11498, 2015.
Lee et al., In-situ Monitoring of Temperature and Voltage in Lithium-Ion Battery by Embedded Flexible Micro Temperature and Voltage Sensor, International Journal of Electrochemical Science, 8, 2968-2976, 2013.
Lee et al., Integrated microsensor for real-time microscopic monitoring of local temperature, voltage and current inside lithium ion battery, Sensors and Actuators A: Physical vol. 253, pp. 59-68, Jan. 1, 2017.
Drake et al., Heat generation rate measurement in a Li-ion cell at large C-rates through temperature and heat flux measurements,Journal of Power Sources, vol. 285,pp. 266-273, 2015.
Forgez et al., Thermal modeling of a cylindrical LiFePO4/graphite lithium-ion battery, Journal of Power Sources, vol. 195, Issue 9, pp. 2961-2968, 2010.

(Continued)

*Primary Examiner* — Anca Eoff
(74) *Attorney, Agent, or Firm* — Piroozi-IP, LLC

(57) ABSTRACT

A battery having a thermal protection arrangement is disclosed which includes a housing, a first electrode, a second electrode, a polymer porous separator positioned between the first electrode and the second electrode, an electrolyte interspersed between the first electrode, the second electrode, and the polymer porous separator, at least one sensor holder having an electrode side and a housing side, with at least one cavity provided on the electrode side, the at least one sensor holder in firm contact with the first electrode or the second electrode, and at least one temperature sensor placed in the at least one cavity of the at least one sensor holder, the at least one cavity sized such that the outer surface of the temperature sensor being flush with remaining surface of the at least one sensor holder, and wherein the at least one temperature sensor has no contact with the polymer porous separator.

10 Claims, 15 Drawing Sheets

(56) References Cited

OTHER PUBLICATIONS

Zhang et al., Real-time estimation of battery internal temperature based on a simplified thermoelectric model, Journal of Power Sources, vol. 302, pp. 146-154, 2016.
Sun et al., Online Internal Temperature Estimation for Lithium-Ion Batteries Based on Kalman Filter, Energies, vol. 8, pp. 4400-4415, 2015.
Richardson et al., Battery internal temperature estimation by combined impedance and surface temperature measurement, Journal of Power Sources, vol. 265, pp. 254-261, 2014.
Srinivasan et al., Instantaneous measurement of the internal temperature in lithium-ion rechargeable cells, Electrochimica Acta, vol. 56, Issue 17, pp. 6198-6204, 2011.
Schmidt et al., Measurement of the internal cell temperature via impedance: Evaluation and application of a new method, Journal of Power Sources, vol. 243, pp. 110-117, 2013.

\* cited by examiner

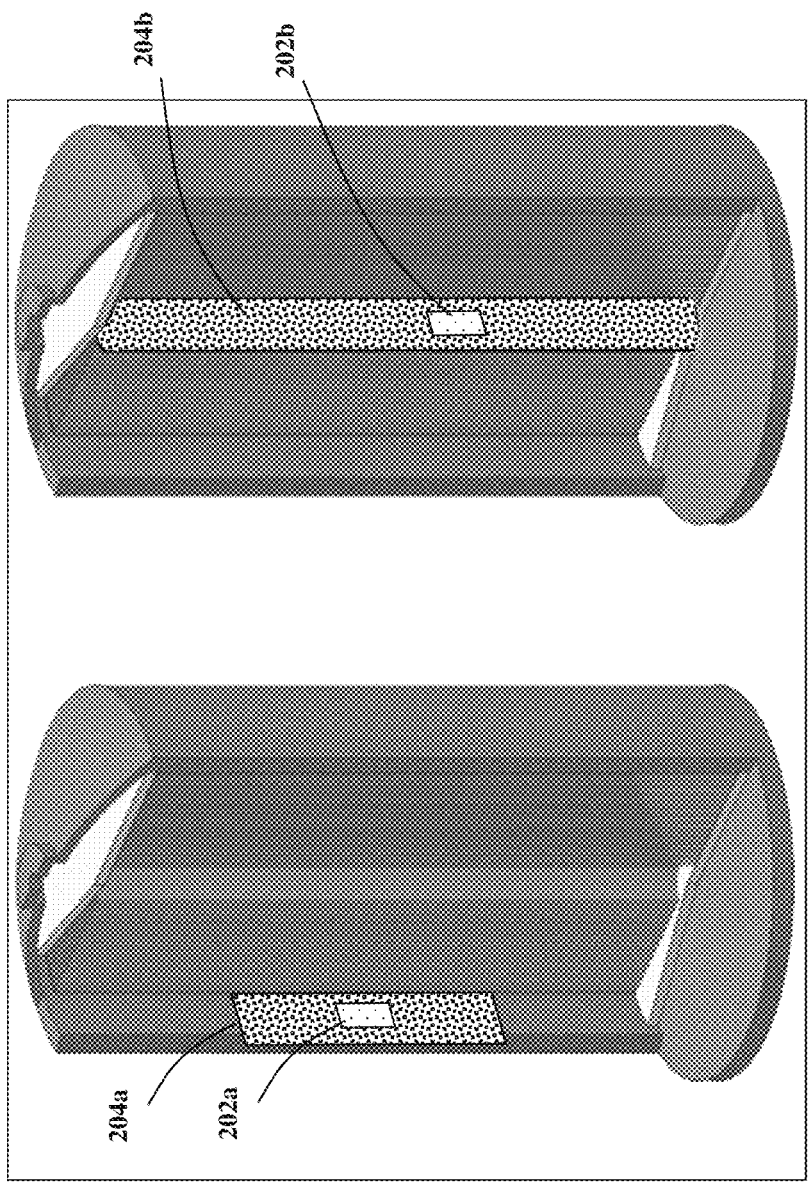

ARRANGEMENT FOR LITHIUM-ION BATTERY THERMAL EVENTS PREDICTION, PREVENTION, AND CONTROL

CROSS-REFERENCE TO RELATED APPLICATIONS

The present patent application is related to and claims the priority benefit of U.S. Provisional Patent Application Ser. No. 62/726,140 filed 31 Aug. 2018, the contents of which are hereby incorporated by reference in its entirety into the present disclosure.

STATEMENT REGARDING GOVERNMENT FUNDING

This invention was made with government support under N00014-16-1-3109 awarded by the Office of Naval Research. The government has certain rights in the invention.

TECHNICAL FIELD

The present disclosure generally relates to battery systems, and in particular to thermal management systems used in systems of batteries.

BACKGROUND

This section introduces aspects that may help facilitate a better understanding of the disclosure. Accordingly, these statements are to be read in this light and are not to be understood as admissions about what is or is not prior art.

Lithium ion batteries and their supporting systems are commonplace. With the shift from fossil fuel to electric/hybrid/hybrid-electric vehicles, lithium ion batteries are nowadays ubiquitous. Thermal runaway situations pose significant hazards. These thermal runaway events are often connected with internal battery conditions, e.g., changes in resistance. Thus there is a significant need to monitor temperature of a battery during battery operation. The battery surface temperature rise has long been used as an indicator of these thermal events. For example, in one prior art work, K-type thermocouples were used to measure battery case temperature during short circuit. Despite the ease of this method, external surface temperature measurement requires the electrode generated Ohmic heat to be transmitted onto the battery case. Thus, on-site electrode thermal condition variation cannot be measured; instead at best only significant heat generation of cells with high capacity are ascertainable. In another prior art work, T type thermal couples were attached between anode and cathode of AA batteries during winding process, and temperature difference up to 50° C. was observed between internal and external thermocouple measurements, indicating inefficacy of measurements on the case. In that work, the internal thermocouple was able to provide information that can be used to report the threshold temperature of 80° C. 20 s in advance.

However, coupling thermocouple to electrodes with diameter of 100 μm between electrode pairs may cause intervening electrochemical reactions, resulting in unwanted chemical processes. Furthermore, a tight contact between electrode and thermocouple cannot be maintained for robust temperature measurement without damaging the electrode. Finally, it has been shown that even minute direct load to the electrode can result in significant battery capacity reduction. Thus, in the prior art, there is no solution for electrode temperature monitoring with minimal electrode material damage and interference to battery operation.

Therefore, there is an unmet need for a novel approach to measure temperature of battery systems for reliable in-service electrode temperature measurement and monitoring without damage to electrode material in order to predict, prevent, and control a thermal event.

SUMMARY

A battery having a thermal protection arrangement is disclosed. The battery includes a housing wherein the housing has a positive cap and negative cap that are electrically isolated from one another, a first electrode positioned in the housing, a second electrode positioned in the housing, a polymer porous separator positioned between the first electrode and the second electrode, an electrolyte provided in the housing interspersed between the first electrode, the second electrode, and the polymer porous separator, at least one sensor holder having an electrode side and a housing side, with at least one cavity provided on the electrode side, the at least one sensor holder configured to be firmly attached to one of the first electrode or the second electrode, and at least one temperature sensor placed in the at least one cavity of the at least one sensor holder, the at least one cavity sized such that the outer surface of the temperature sensor being flush with remaining surface of the at least one sensor holder, and wherein the at least one temperature sensor has no contact with the polymer porous separator.

A method of measuring the temperature of a battery is disclosed. The method includes the steps of providing at least one sensor holder having an electrode side and a housing side, with at least one cavity provided on the electrode side. The method also includes providing at least one temperature sensor placed in the at least one cavity of the at least one sensor holder, the outer surface of the at least one temperature sensor being flush with the remaining surface of the at least one sensor holder, and wherein the at least one temperature sensor has no contact with a polymer porous separator of the battery. The method further includes attaching the at least one current collector to one of a first electrode or a second electrode of the battery. The method also includes coupling the at least one temperature sensor to a header, wherein the header has a plurality of pins on the outside surface of the housing. A reader is connected to the plurality of pins on the outside surface of the housing in order to measure the temperature of the battery.

BRIEF DESCRIPTION OF DRAWINGS

FIGS. 13a and 13b are alternative embodiments for how to assemble a sensor holder and an RTD sensor in an 18650 (AA) battery.

DETAILED DESCRIPTION

Figure 1:
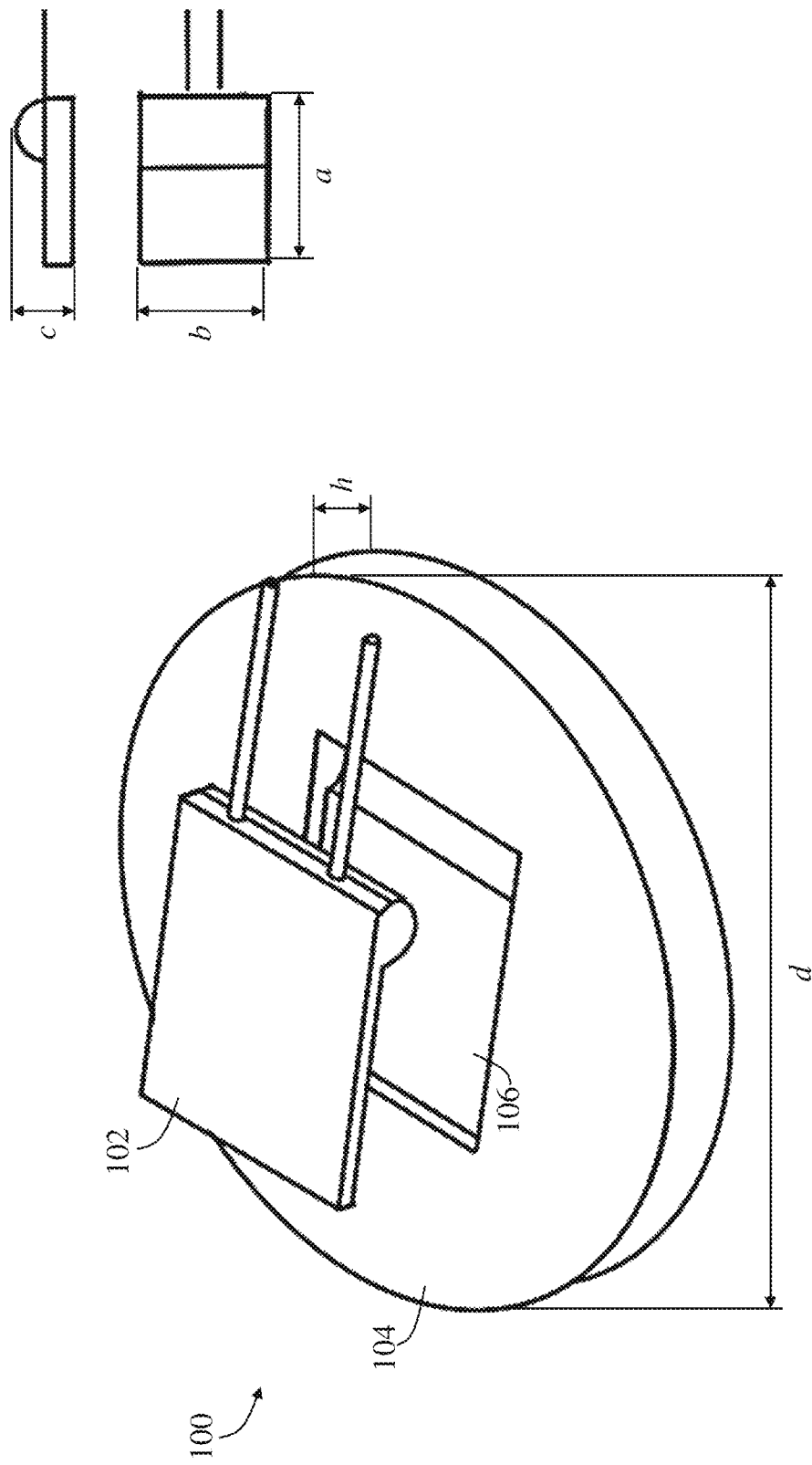
FIG. 1 is a perspective view of a resistance temperature detector (RTD) sensor system including a polylactic acid (PLA) sensor holder and an RTD sensor.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

A novel approach for measuring the temperature of battery systems based on reliable in-service electrode temperature measurement and monitoring without damage or interference to electrode material is presented in order to predict, prevent, and control a thermal event. The arrangement includes resistance temperature detectors (RTDs) that are embedded with electrodes based on three criteria: (1) sustaining ordinary battery construction, (2) minimizing electrode damage and interference to battery operation and (3) acquiring regional real-time electrode temperature accurately. For accurate electrode temperature monitoring, a robust sensor-electrode contact is desired, which requires sensor surface to pair well with the electrode. A flat sensing surface is preferred to fit the electrode of a coil cell, as minimized sensing surface can help to provide localized temperature measurement. With these considerations, an RTD provided by OMEGA ENGINEERING with a flat $Al_2O_3$ temperature sensing surface was selected, according to the present disclosure, where the sensor geometry is further detailed in FIG. 1. The RTD sensor 102, shown in FIG. 1, is a platinum temperature sensitive element which possesses temperature dependent resistance of $R=(3.9083*10^{3\circ} \text{ C.}^{-1}*T - 5.775*10^{-7\circ} \text{ C.}^{-2}*T^2) k\Omega$, as shown in FIG. 2 which is a plot of resistance in ohms (Ω) vs. temperature in ° C.

Figure 2:
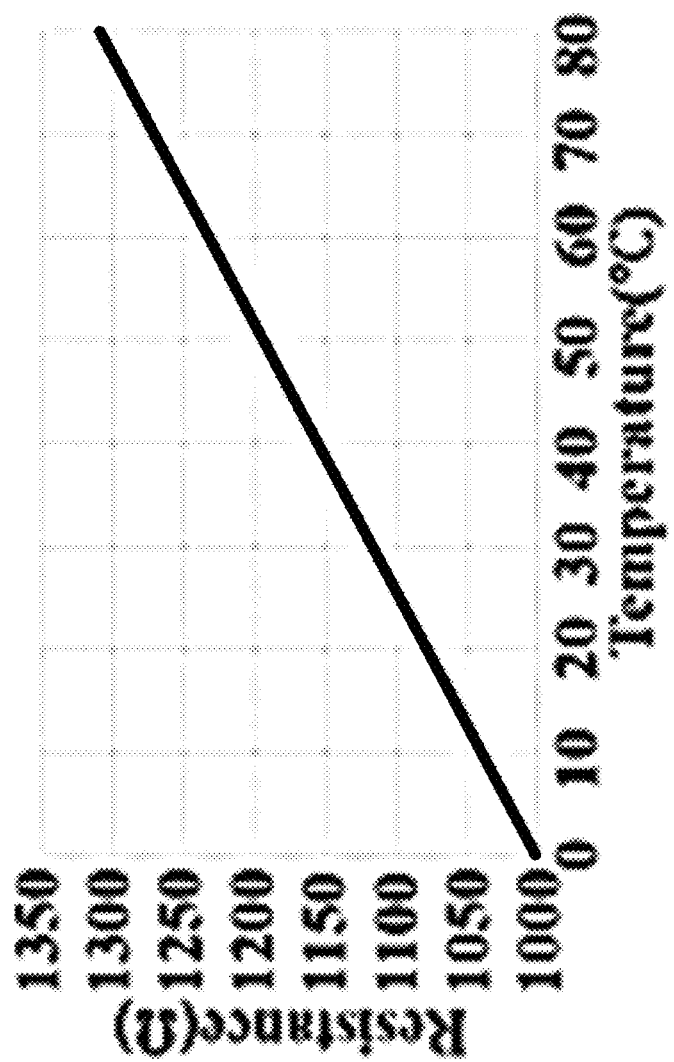
FIG. 2 is a plot of the RTD sensor resistance in ohms (Ω) vs. temperature in ° C.

Referring to FIG. 1, an embodiment of an RTD embedded polymer sensor holder 100 is shown. The RTD embedded polymer sensor holder 100 includes an RTD sensor 102 and a polylactic acid (PLA) sensor holder 104. One effective method to combine the RTD sensor 102 into a battery without disturbing cell structure and without causing damage to the electrode is to embed the RTD sensor 102 in a component that is in direct contact with the electrode current collector. For this purpose, a sensor holder 104 was developed using fused deposition modeling (FDM) of, but not limited to PLA, whereby the RTD sensor 102 can be embedded into a cavity 106 of the sensor holder 104 with a smooth surface final finish. Alternative to PLA, the sensor holder 104 can be made of acrylonitrile butadiene styrene (ABS), polyether ether ketone (PEEK), nylon, polyethylene terephthalate (PETG), polystyrene (PS). The RTD sensor 102 is defined by length a, width b, and height c. The sensor holder 104 is defined by a height h, and a diameter d. In one embodiment the height h of the sensor holder 104 is about 1.2 millimeters and the diameter d is about 14 millimeters. In one embodiment the length a, width b, and height c, of the RTD sensor 102 is about 5 millimeters, about 4 millimeters, and about 0.8 millimeters, respectively. The geometry of sensor holder 104 can be customized during FDM to fit into other types of battery cells, while maintaining the direct sensor-electrode contact.

Figure 3B:
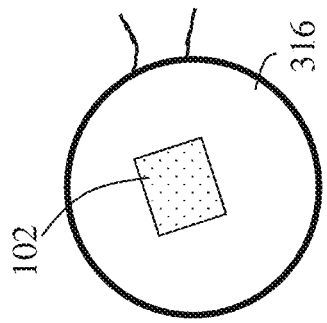
FIG. 3b is a top view of a sensor holder with an embedded RTD thereon.
Figure 3C:
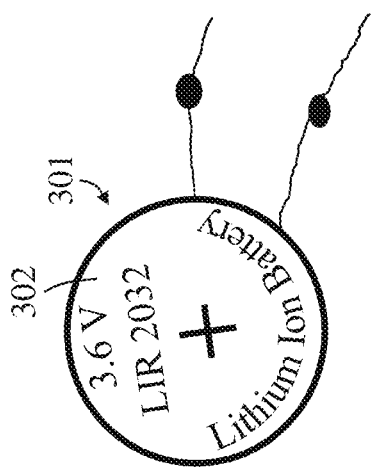
FIG. 3c is a bottom view of an assembled lithium ion battery with an RTD, according to the present disclosure.
Figure 3A:
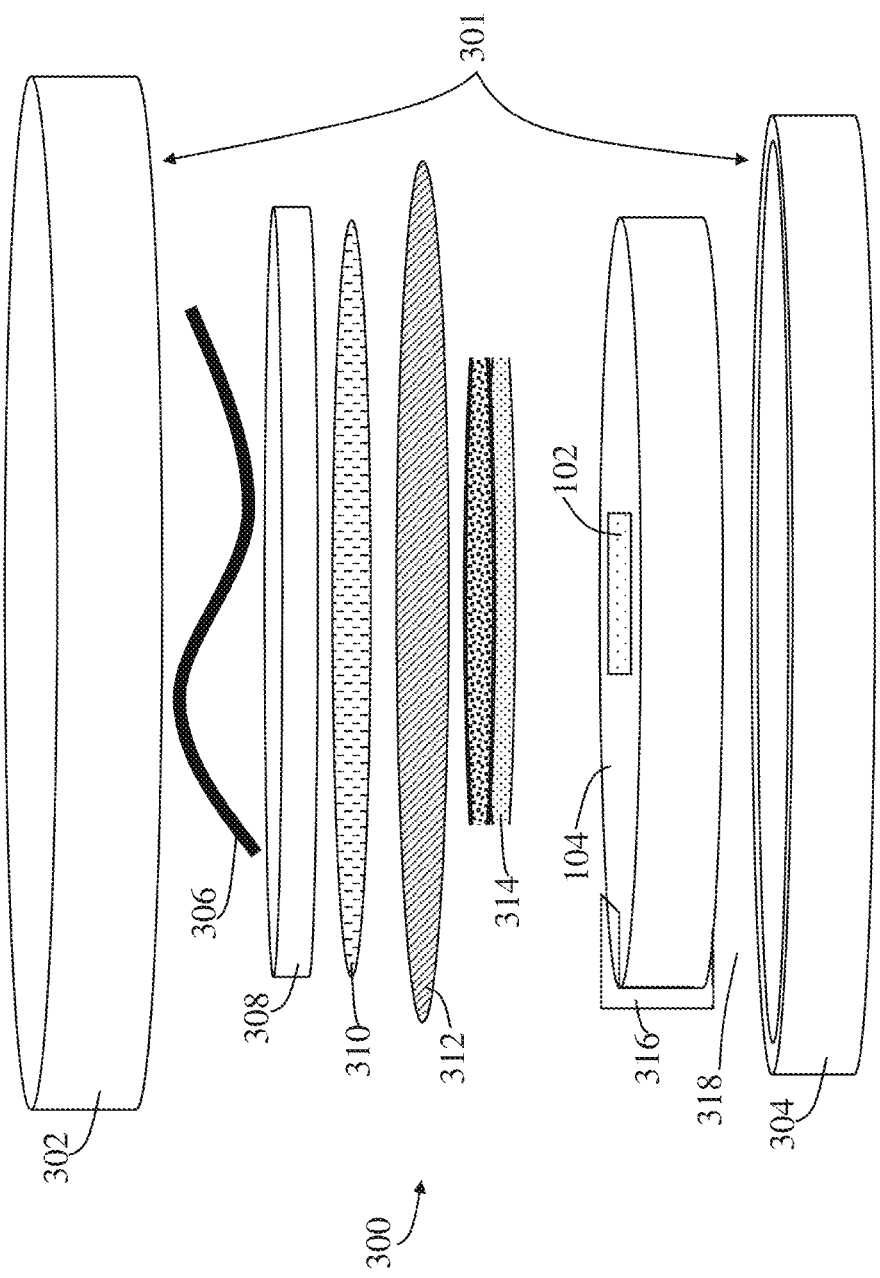
FIG. 3a is an exploded schematic of a battery including a sensor holder and an RTD embedded therein.

Referring to FIG. 3a, an exploded schematic of a battery 300 including the sensor holder 104 and the RTD sensor 102 embedded therein is shown. The battery 300 includes a housing 301 which includes a positive cap 302 and a negative cap 304 that are electrically isolated from one another by an insulating ring (not shown). Under one of the caps (in FIG. 3a, under the positive cap 302) is a spring 306 that is contact with a cap current collector 308 which is made of, but not limited to, stainless steel. Attached to the cap current collector 308 is the first electrode 310 which, in FIG. 3a, is the positive electrode which is made of a lithium foil. Coupled to the first electrode 310 is a microporous polymer separator 312, where according to one embodiment the microporous polymer separator 312 is a polypropylene film. Coupled to the microporous polymer separator 312 is the second electrode 314 which, in FIG. 3a, is the negative electrode. The darkened area atop the second electrode 314 is part of the electrode material. Coupled to the second electrode 314 is a current collector 316 that provides electric conductivity between negative cap 304 and second electrode 314. The material of current collector is, but not limited to, aluminum. While the current collector 316 is shown to be in contact with the second electrode 314 (i.e., the negative electrode), the same arrangement or an additional arrangement can also be provided for contacting an RTD sensor 102 to the first electrode 310 (i.e., the positive electrode). For this purpose, the sensor holder 104 was customized with fused deposition molding (FDM) of polylactic acid (PLA) and the RTD sensor 102 can be embedded into the sensor holder 104 with smooth surface final finish. This sensor holder 104 can be produced by a molding process, three-dimensional printing process, or a variety of other manufacturing techniques known to a person having ordinary skill in the art for application in a variety of batteries. The sensor holder 104 is designed such that a cavity 106 (shown in FIG. 1) is provided on the side facing the second electrode 314 so as to receive the RTD sensor 102 in a manner in which the top surface of the RTD sensor 102 is flush with the sensor holder 104 allowing for a robust contact between the current collector 316, the RTD sensor 102, and the second electrode 314. In the space between the positive cap 302 and negative cap 304 interspersing between the above-described components is an electrolyte 318 (containing a fluid not shown). By placing and embedding the RTD sensor 102 in the sensor holder 104 as shown in FIG. 3a and described above, damage to electrode material is minimized while a tight RTD-electrode contact improves measuring efficiency compared to existing work of placing a thermocouple onto electrode material. The sensor holder 104 is designed (diameter of about 14 mm) to allow full support for the RTD 102 while maintaining a robust contact with current collector 316 and electrode 314. By varying the location that the RTD sensor 102 is embedded, critical regions prone to thermal hazards can be determined. While, only one such RTD sensor 102 is shown, a plurality of RTDs can be scattered across the surface of the sensor holder 104 to make a plurality of appropriate measurements. In the embodiment shown, the customized cell is for a coin cell design and makes it suitable for proof testing and battery pack temperature monitoring. However, the same approach can be used for a variety of different types of lithium ion devices.

The RTD sensor 102 shown is a passive device. As such, the RTD sensor 102 or a network of RTDs can be coupled to a header with a plurality of pins on the outside surface of the housing 301 (e.g., the positive cap 302, the negative cap 304, or both) to be connected to a reader. This approach requires internal connectivity between the RTD sensors 102 and the housing 301, such as through the sensor holder 104.

Figure 3D:
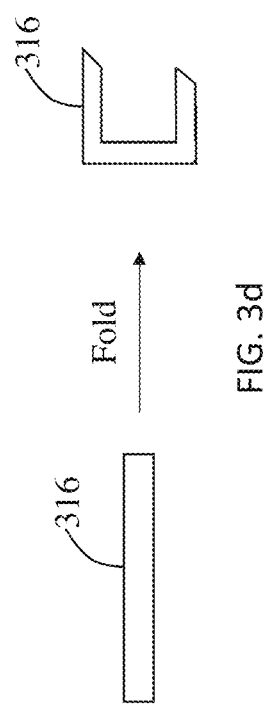
FIG. 3d is a schematic of a current collector and how it is formed.
Figure 3E:
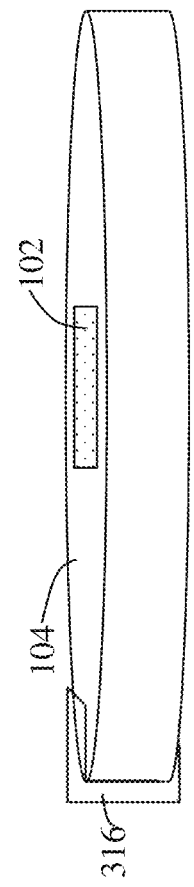
FIG. 3e is a schematic of the sensor holder of FIG. 3a and how the current collector of FIG. 3d is attached thereto.
Figure 3E:
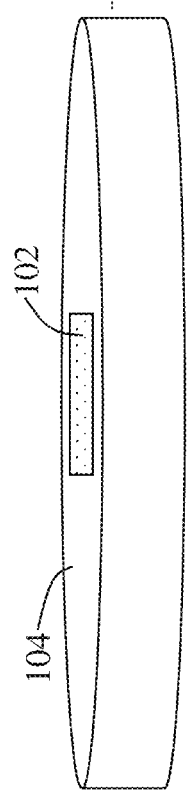

Referring to FIG. 3b, a top down view of the sensor holder 104 with embedded RTD sensor 102 is shown. Referring to FIG. 3c, a top down view of a lithium ion battery showing the positive cap 302 of the housing 301. FIG. 3d is a schematic of the current collector 316 and how it is formed. FIG. 3e is a schematic of the sensor holder 104 of FIG. 3a and how the current collector 316 of FIG. 3d is attached thereto.

For evaluation of measuring accuracy and efficiency, the RTD sensor 102 was applied for temperature measurement of a proportional-integral-derivative controller (PID) controlled hot stage, which was set to various temperatures from 30° C. to 70° C., and the measurement error was recorded. To ensure the RTD sensor 102 and sensor holder 104 do not interact with the electrochemical reaction during the operation of the battery 300 or introduce any side reaction, an RTD embedded sensor holder 100 (shown in FIG. 1) was immersed into an electrolyte solution (1M $LiPF_6$ EC/DEC (Sigma-Aldrich)) for 5 days. Fourier-transform infrared (FTIR) spectrum of a pristine electrolyte and the electrolyte with the immersed sensor embedded sensor holder were compared for electrochemical stability analysis of the RTD embedded polymer sensor holder 100.

Figure 4A:
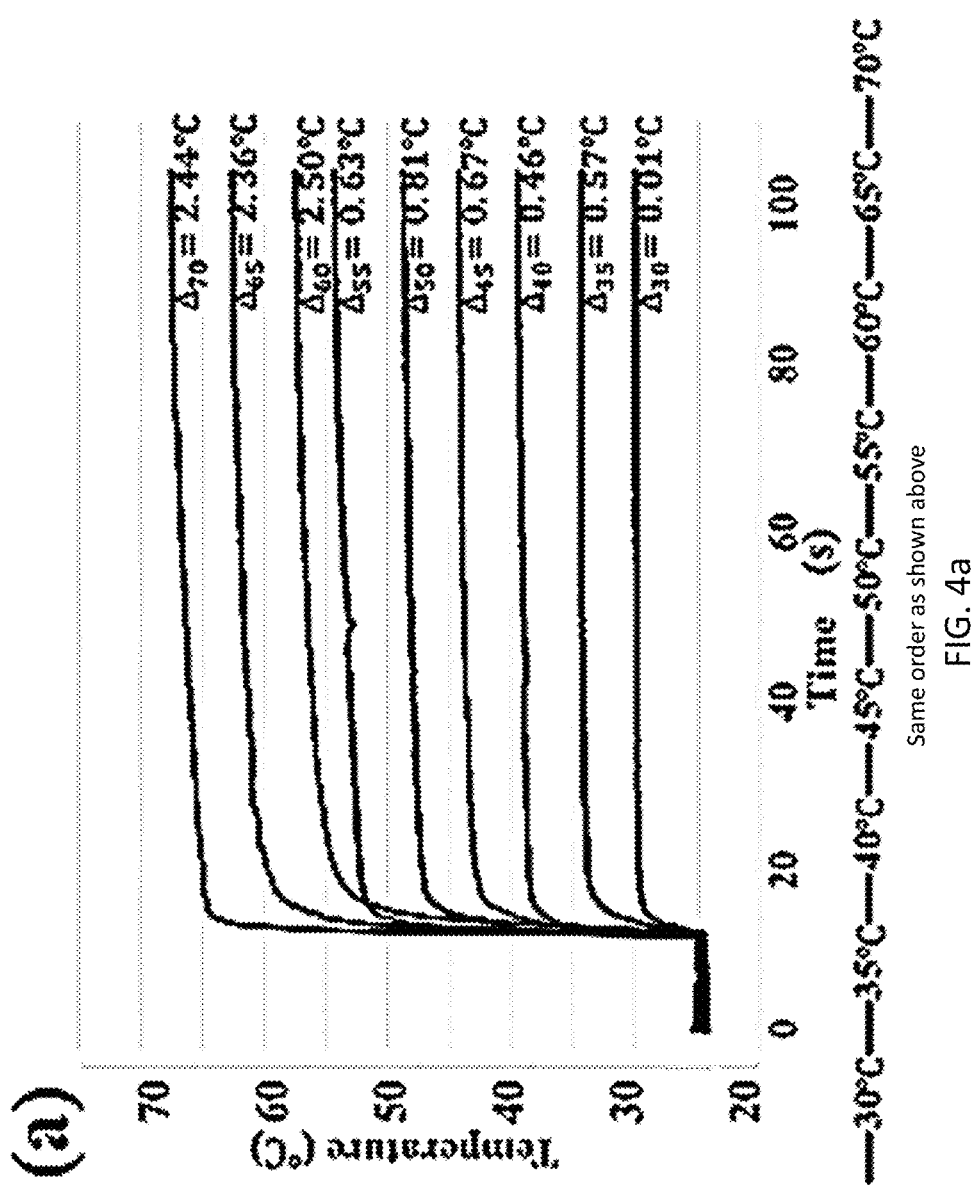
FIG. 4a is a graph of temperature vs time for various differences in temperatures used to test temperature measuring accuracy of an RTD embedded sensor holder.
Figure 4B:
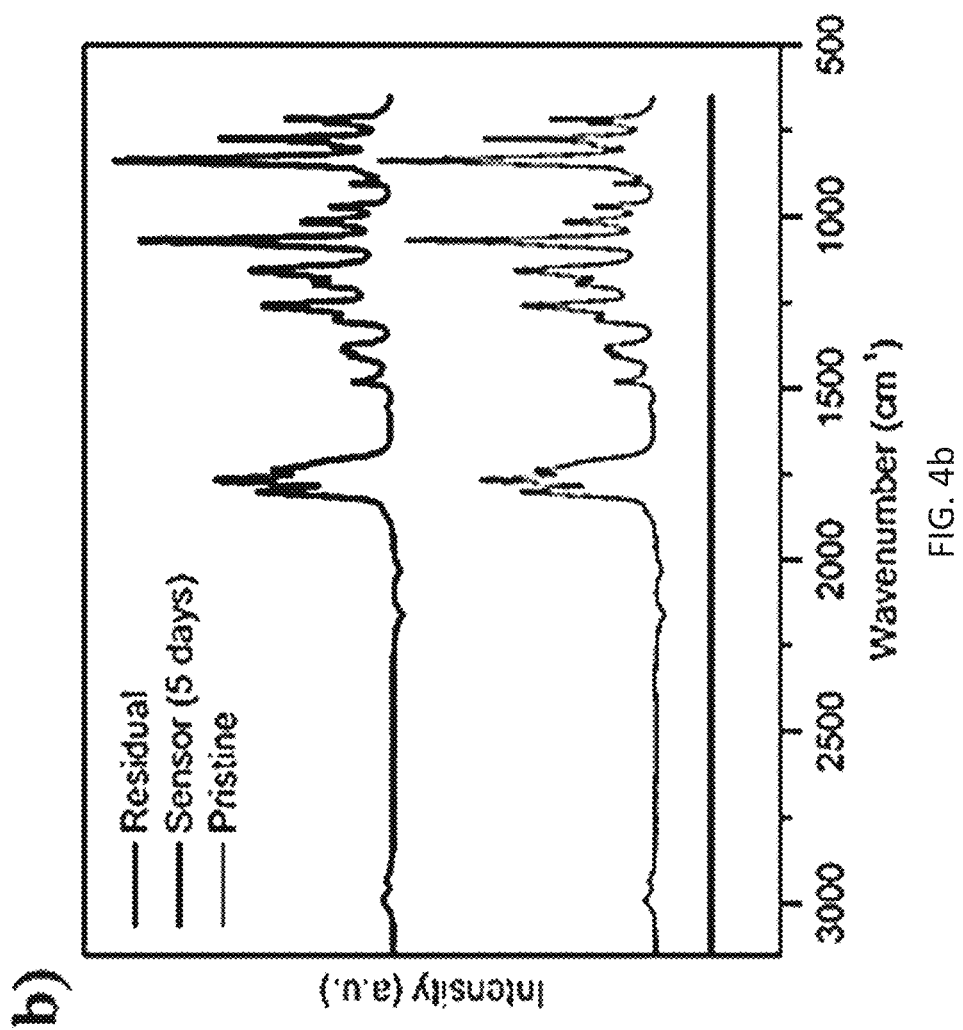
FIG. 4b is a graph of intensity vs. wave number for Fourier-transform infrared spectrum analysis of electrolyte chemical stability for an RTD embedded sensor holder.

A short circuit event was selected as an extreme thermal event for internal battery temperature evaluation due to the violent temperature rise and dramatic change to the electrode structure. Two RTDs were employed for battery temperature assessment: an internal RTD sensor 102 embedded on a sensor holder 104 was assembled beneath the electrode 314 (as shown in FIG. 3a), and an external RTD was clamped onto the positive terminal of the battery 300. An infrared camera was used for profiling the surface temperature of the battery 300 as a comparison with the temperature measurements of an external RTD. The short circuit event was controlled by connecting positive and negative poles of a battery 300, and a multimeter was used for the short circuit current measurement, which is related with Ohmic heat power and thermal condition variation within the battery 300. The battery 300 was shorted for 10 minutes and three temperature acquisitions were accomplished over the entire shorting period. The results of temperature measuring accuracy and electrochemical stability assessment of an RTD embedded polymer sensor holder 100 (shown in FIG. 1) are provided in FIG. 4a, which shows a graph of temperature vs. time for various differences in temperatures, and FIG. 4b, which shows a graph of intensity vs. wave number for Fourier-transform infrared spectrum analysis of electrolyte chemical stability. In FIG. 4a, the RTD embedded polymer sensor holder 100 was placed on a PID controlled hot stage at t=10 seconds. From the temperature measurement result, the RTD embedded polymer sensor holder 100 is capable of providing temperature measurement with error less than one degree Celsius (<1° C.) up to a target temperature of 55° C., which is a typical upper limit for safe operation of a lithium ion battery. The reaction time of the RTD to reach 90% of temperature rise was within five seconds for all the cases. The RTD embedded polymer sensor holder 100 is capable of providing accurate temperature measurement with high efficiency over the scope of regular battery operating temperature. From FIG. 4b, there was no noticeable spectrum pattern change observed, and the RTD sensor 102 and sensor holder 104 (shown in FIG. 3a) were both electrochemically inert to avoid intervening with battery operation or introducing side effects.

Figure 5:
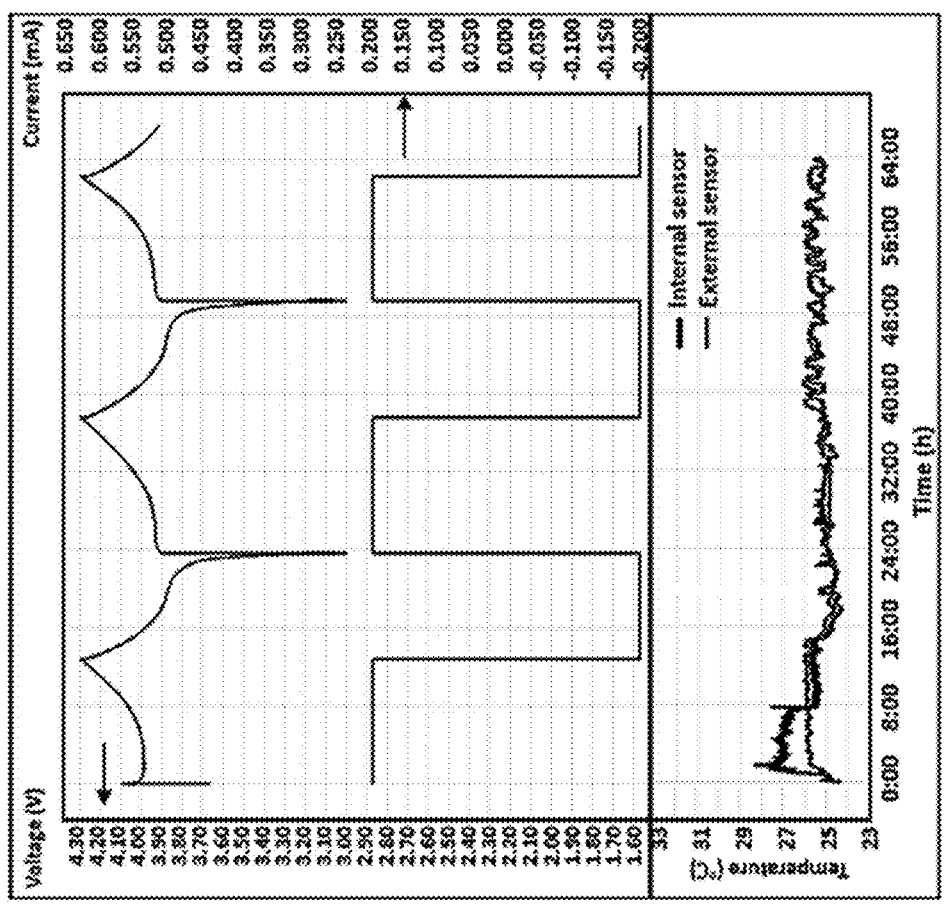
FIG. 5 is a complex graph of temperature vs. time in hours for both the internal and external RTD sensors as well as cyclic voltage and current measurements.

Next room temperature dynamic stability was tested for the battery. The customized cell was firstly cycled at room temperature (24° C.) according to NVSEA 9310 vibration test procedures. The vibration input lasted for nine hours at the initial stage of cycling, and the cell was charged and discharged with a constant current rate of C/15. The cycling and temperature profile are shown in FIG. 5 which provides a complex graph of temperature vs. time in hours for both the internal RTD sensor 102 and the external RTD sensor as well as cyclic voltage and current measurements. From the cycling profile, it can be observed that the internal and external RTDs presented temperature monitoring results with similar characters, while the internal RTD sensor 102 detected temperature fluctuation prior of time with higher amplitude than compared with the external RTD on the battery housing. The internal RTD sensor also presented more detailed features on the temperature profile. This corresponds with the process of Ohmic heat generated at electrode material dissipating into the environment through the battery case. The customized cell presented relatively consistent behavior for all the three cycles and no obvious thermal related hazard or extraordinary electrochemical performance was noticed.

Figure 6:
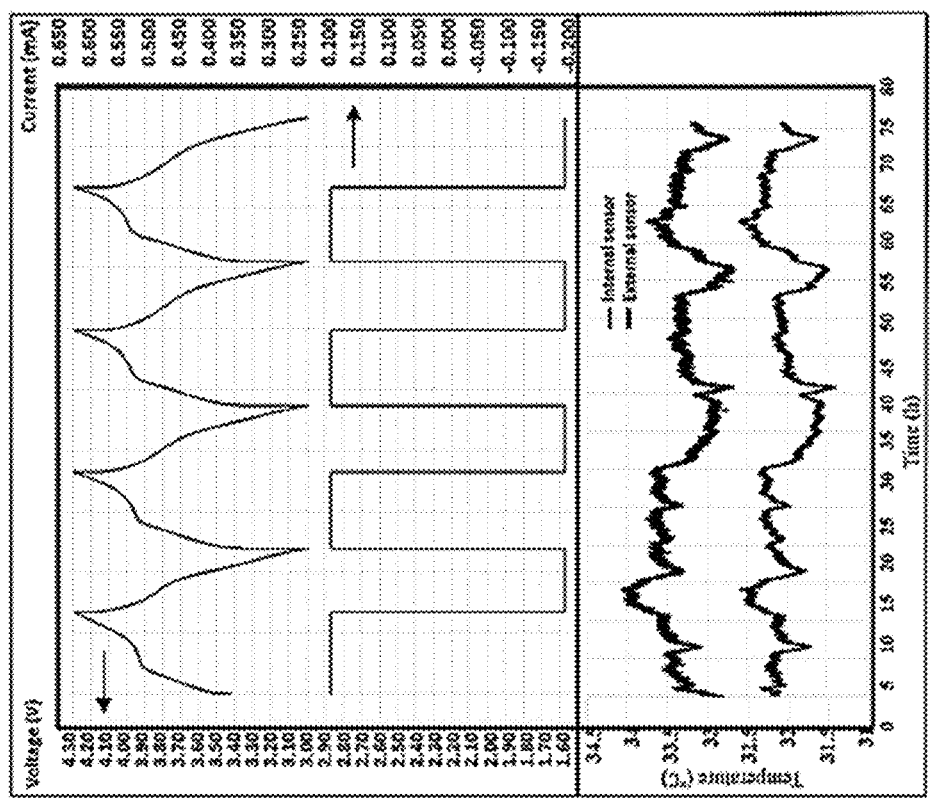
FIG. 6 is a complex graph of temperature vs. time in hours for both the internal and external sensors as well as cyclic voltage and current measurements.

Next, an elevated temperature dynamic stability analysis was performed. The customized battery cell was charged at an elevated temperature (35° C.) with constant current and vibration input described in the NVSEA 9310 procedure and as shown in FIG. 6, which shows a complex graph of temperature vs. time in hours for both the internal and external sensors as well as cyclic voltage and current measurements. For the elevated temperate cycling test, the internal sensor and external sensor presented relatively similar measurement results compared with results from the room temperature charging test. The internal sensor presented more subtle temperature transients than the external sensor, especially for the beginning stage of cycling. Noticeable temperature decrements were captured by both internal and external sensors during discharging steps of the battery. The decrements typically started shortly after the beginning of discharging, and temperature rising would follow up the temperature decrement before end of the discharging state. The repeating temperature profiles for cycles two through four in FIG. 6 presents that battery temperature is bonded with electrode chemical composition when charged and discharged at elevated temperatures. When charging the cell at room temperature, both the internal and external sensor reported no temperature data higher than 30° C. Thus, for cycling at 35° C., environmental temperature conditions became dominant for the thermal field of the battery, and this can explain for the similarity of temperature profiles captured by the external and internal sensors.

Based on the above results it can be concluded that the embedded RTD within the battery cell presents electrode temperature monitoring capability that is superior to the external RTD, and the embedded RTD will not intervene with the ordinary battery operation. The customized cell design was proved to be comparable with a regular cell under a dynamic test of room temperature and the product can be used for a proof test and applied in a battery pack for safety monitoring.

Figure 7:
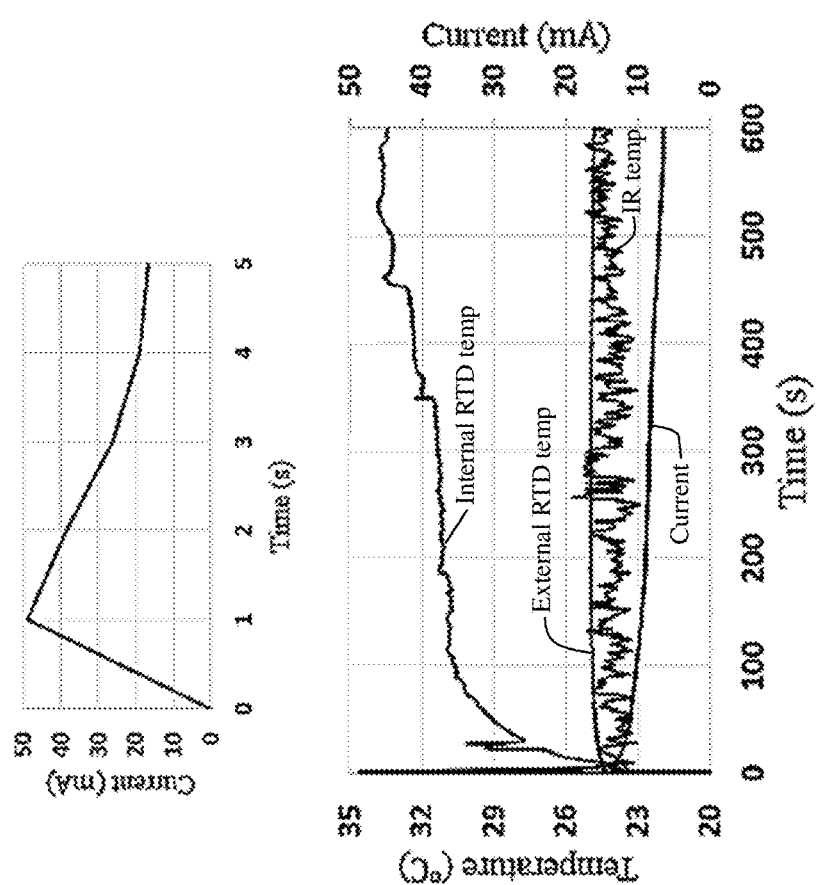
FIG. 7 is a complex graph of temperature (in ° C.) vs. time (in seconds) based on internal RTD, external RTD, and IR temperature readings as well as current in the short circuit condition with a separate graph for current vs. time showing the behavior in a zoomed manner.

Referring back to the short circuit event test, temperature profiles acquired by internal and external RTD as well as by an infrared (IR) camera are presented in FIG. 7, which provides complex graphs of temperature vs. time (in seconds) based on internal RTD, external RTD, and IR camera temperature readings as well as current in the short circuit condition with a separate graph for current vs time showing the behavior in a zoomed in manner (i.e., over only 5 seconds). The short circuit current dropped dramatically after the short circuit event at t=0 seconds, the current decrement was mild after t=20 seconds, and the final current was 9.5 mA. For the infrared camera measurement, the fluctuation was significant and there was no clear tendency of temperature change. This was due to the limited surface temperature increment and infrared imaging condition variation over time (air flow, etc.). For a battery with limited capacity such as a coin cell, a limited rise in surface temperature makes infrared imaging ineffective for thermal profiling. Both the internal and external RTD presented a noticeable rise in temperature with differing incremental values. Despite the limited short circuit current after the initial shorting stage, the internal electrode temperature kept increasing until t=520 seconds, and maximum electrode temperature was reported by the internal RTD as 34.45° C., compared with the maximum temperature at battery surface of 24.4° C. A comparison of measurement efficiency of external and internal RTDs is provide in Table 1 below. The increasing temperature difference and measuring efficiency indicated that a direct electrode temperature measurement was necessary for safety management of the battery as surface temperature cannot reflect the thermal condition of the electrode. The electrode surface temperature maintained well after short circuit current decay, indicating effective heat conduction from electrode to battery surface of an RTD embedded cell.

TABLE 1

Measurement Comparison of External RTD and Internal RTD

|  | Internal sensor | External sensor | Infrared camera (triangular smoothing) |
|---|---|---|---|
| Time detecting 24.8° C. | 11 s | 47 s | 252 s |
| Time detecting 25° C. | 11.5 s | 189.5 s | 278 s |

From Table 1, it can be seen that the internal RTD is capable of reporting a target temperature of 24.8° C., 36 seconds faster than the external RTD, and 178 seconds faster for a target temperature of 25° C. The measuring efficiency is superior to the prior art work, such as the use of an internal thermocouple, as tight RTD-electrode contact was achieved with a sensor holder ensuring a robust thermal interface. For cells with a limited capacity such as a coin cell, Ohmic heat generated in the electrode is limited and accurate sensing achieved by embedding an RTD in a sensor holder is important. The RTD sensor 102 can also be placed on various regions of the sensor holder 104 (shown in FIG. 3a) for analysis of the effect that heat dissipation has on an electrode temperature profile, which will provide a complete temperature profile of the electrode and reveal critical regions exposed to thermal hazards. These are vital for real-time assessment of electrode operating condition and battery safety management, as battery packs possess complex electrode systems and monitoring of representative target electrode regions can improve the speed of temperature assessment for on-site hazard prediction, prevention and control.

In another short circuit test, maximum temperature rise detected at battery surface ($T_{EMax}$) is used as a reference for analysis, and the results are shown in Table 2 below. In this table the $T_{EMax}$ column represents the temperature difference ($\Delta T$) between room temperature (about 24.25° C.) and temperature rise on the battery surface. Therefore, the first row of $T_{EMax}$ (0.5° C.) represents 24.75° C., the second row (1.32° C.) represents 25.57° C., and the third row (2.43° C.) represents 26.88° C. In the next columns, time to reach that temperature at various fractions are presented. For example, in the first grouping time to reach 70% of the 0.5° C. rise for both internal sensors and external sensors are provided. In one example, it took the internal sensor 2.5 seconds to reach 70% of the 0.5° C. rise (i.e., 0.7*0.5+24.25=24.6° C.) from room temperature (i.e., 24.25° C.) at the internal sensor location. In contrast, it took 75 seconds for the external temperature to arrive at the same temperature (i.e., 24.6° C.). Similarly, the times to reach 80 and 90% of the value listed for $T_{EMax}$ are listed in the next columns. Thus, temperature measuring capability was significantly different between internal and external sensors.

Inspecting Table 2, it can be observed that the first difference was in the maximum temperature rise detected: the internal RTD observed a higher temperature rise, $\Delta T$, than that measured by the external RTD, $\Delta T_{EMAX}$, with an average difference in observed peak temperature of 6.49° C. The second difference came in peak temperature detection time: the internal RTD detected peak temperature when the external RTD reading was stabilized or started dropping due to thermal energy dissipation at battery surface. Three cell groups were used. For cell groups 1, 2 and 3, the external RTD sensor detected peak temperature at about 100 seconds to 150 seconds reflecting that the external RTD sensor failed to detect the actual thermal condition of the electrode, leaving the cell continuously exposed to potential thermal hazards. In all three groups, the internal RTD detected a temperature rise of 90% $T_{EMax}$ within 4 seconds, which was, on average, 58.5 seconds faster when compared with the external RTD sensor, or about 15 times faster than external measurements. These results show more effective temperature measurements than the internal temperature measurements reported in the prior art.

The improvement is mostly attributed to the well-maintained sensor-electrode contact provided by crimping load generated tight assembly between the sensor holder and electrode. In prior art work of electrode temperature measurement, sensors were directly applied on porous electrode material. Lacking installation control, thermocouple measurements may not capture electrode temperature as effectively as mounting can be impaired during measurement. Also, excessive installation pressure can lead to electrode material damage, which can impair battery performance and influence the local electrode temperature field. In contrast, the precisely manufactured RTD embedded polymer sensor holder 100 (shown in FIG. 1) in this work minimizes sensor induced electrode material damage, as the sensor holder provides comparable electrode support to a current collector of the prior art without a sensor.

implementations may be possible, including changing the geometry to fit in other types of battery cells. An illustration on how the FDM technique can help embedding sensors in 18650 (AA) batteries is shown in FIGS. 13a and 13b. Two ways are shown in these figures to incorporate RTD in 18650 cell, however, other arrangements are within the scope of the present disclosure. The first way shown in FIG. 13a is to form at least one internal cavity on the case of 18650 cell to accommodate a sensor holder 204a, while an RTD 202a is embedded in the at least one cavity of the sensor holder 204a. In this case the RTD 202a measures the temperature of electrode at the outer coil. The second way shown in FIG. 13b is to incorporate an RTD 202b and place a cylindrical sensor holder 204b at the core of electrode roll, and the RTD 202b is embedded in the at least one cavity on the sensor holder 204b. In this case the RTD measures the temperature at the inner coil. By changing the geometry of sensor holder, temperature of electrode at different part of the battery can be analyzed and compared.

To verify the reliability of this novel temperature measuring method, 3 cells with internal RTD were prepared for each $LiCoO_2$ mass listed in Table 2. Short circuit test was conducted on these 9 cells, and the maximum temperature increase detected by the internal RTD sensor ($\Delta T$) and

TABLE 2

Summary of customized cells short circuit test

| | $LiCoO_2$ mass (mg) | $\Delta T$ (° C.) | $\Delta T_{EMax}$ (° C.) | Time detecting 70% $T_{EMax}$ (s) | | Time detecting 80% $T_{EMax}$ (s) | | Time detecting 90% $T_{EMax}$ (s) | |
|---|---|---|---|---|---|---|---|---|---|
| | | | | Internal RTD | External RTD | Internal RTD | External RTD | Internal RTD | External RTD |
| Group 1 | 16.96 | 6.92 | 0.50 | 2.5 | 75 | 3.5 | 83 | 4 | 100.5 |
| Group 2 | 23.99 | 8.31 | 1.32 | 3.5 | 18 | 4 | 31.5 | 4.5 | 38.5 |
| Group 3 | 26.76 | 8.51 | 2.43 | 2.5 | 28.5 | 3 | 39 | 3.5 | 48.5 |

Figure 8:
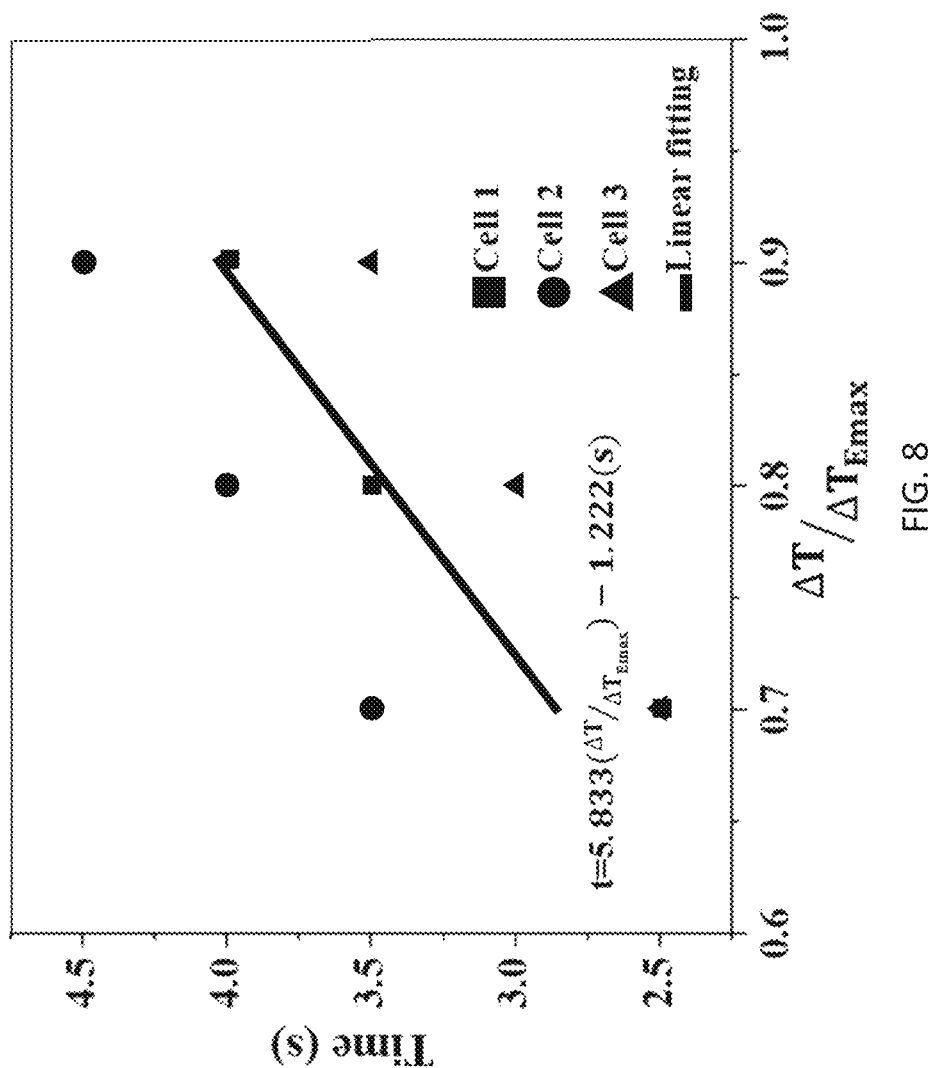
FIG. 8 is a graph showing time in seconds for internal and external sensors to reach the respective temperatures of three cells used in testing.
Figure 9:
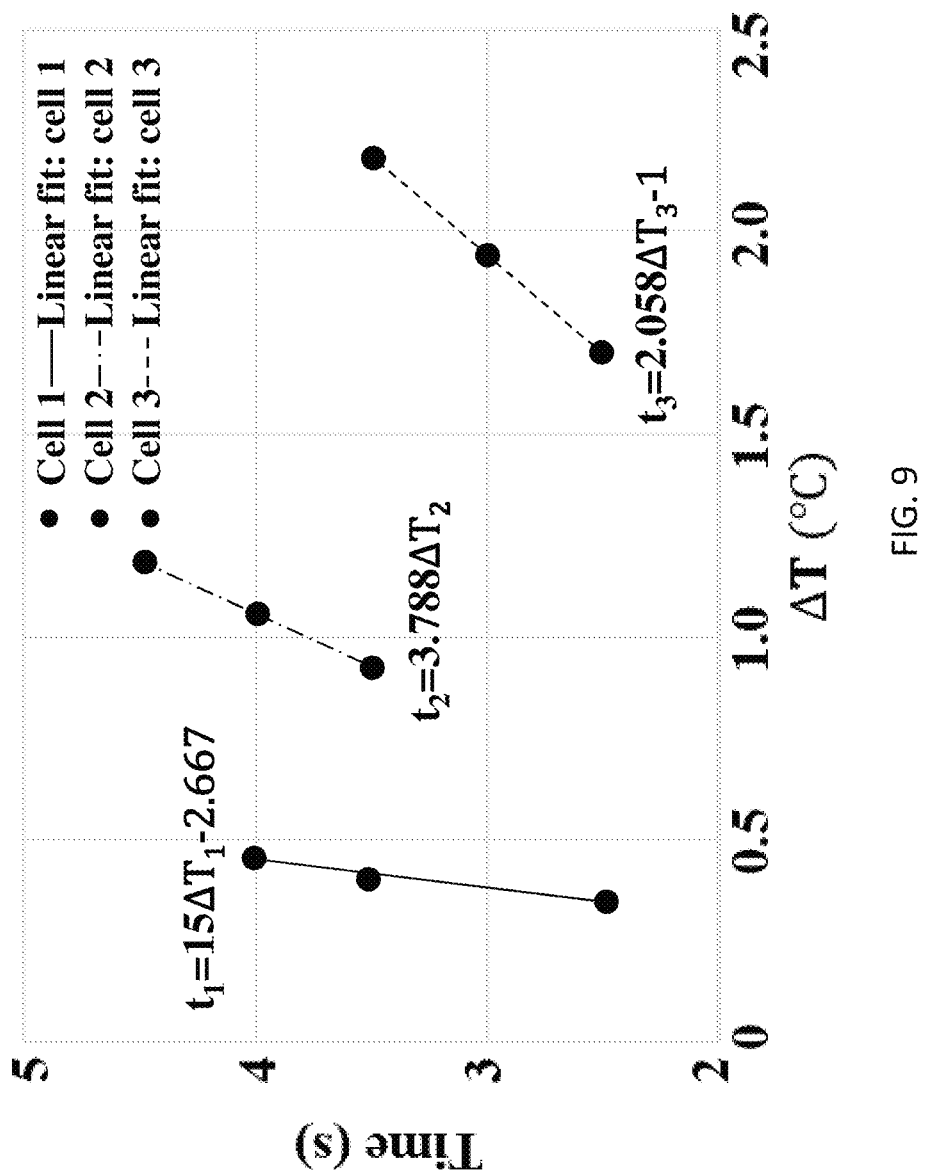
FIG. 9 is a graph of time vs. ΔT for internal temperature sensors of the three cells used in testing.

Referring to Table 3 below, the data from Table 2 is presented with more resolution. The data represents time in seconds for internal and external sensors to reach the respective temperatures shown in the left column. This data is plotted in a normalized fashion ($\Delta T/\Delta T_{Emax}$) for all three cells (i.e., total of 18 data points) and presented vs. time as shown in FIG. 8. The curve fit shows a linear relationship ($t=5.833(\Delta T/\Delta T_{Emax})-1.222$) that can be used to establish the relationship between internal and external temperature readings. To this end, time vs. $\Delta T$ graphs for internal temperature sensors are provided in FIG. 9.

TABLE 3 Additional summary of short circuit test

| | Cell 1 | | Cell 2 | | Cell 3 | |
|---|---|---|---|---|---|---|
| | Internal sensor | External sensor | Internal sensor | External sensor | Internal sensor | External sensor |
| Time detecting 24.8° C. | 2 s | 20 s | 2 s | 10 s | 0.5 s | 2.5 s |
| Time detecting 25° C. | 2 s | 72 s | 2.5 s | 13 s | 1.5 s | 4 s |
| Time detecting 25.2° C. | 2.5 s | 140.5 s | 3.5 s | 15.5 s | 2 s | 6 s |

Figure 10:
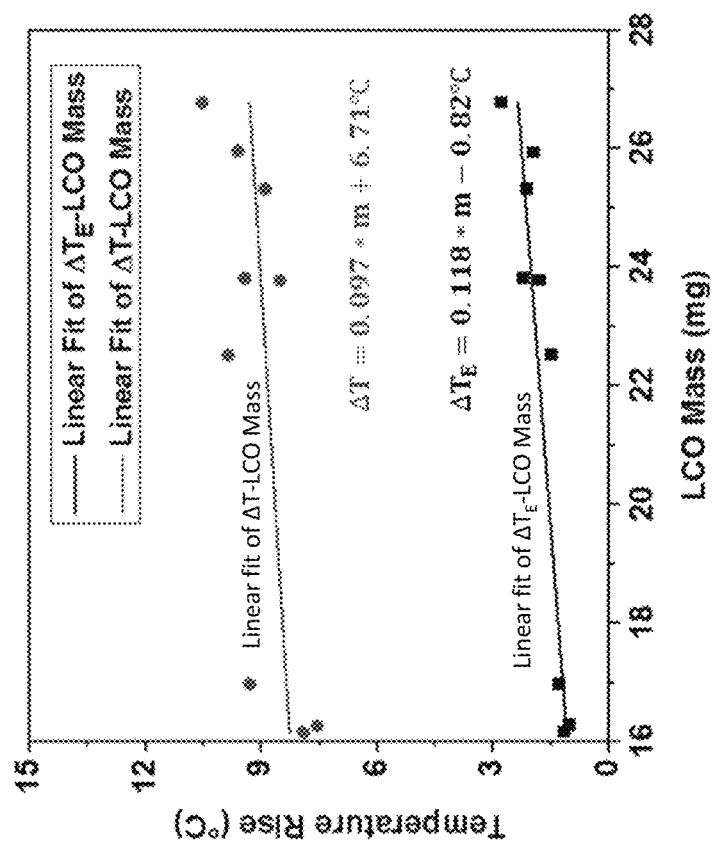
FIG. 10 is a graph of temperature rise in ° C. vs. $LiCoO_2$ (LCO) Mass in mg for both maximum temperature increase detected by the internal RTD sensor (ΔT) and external RTD sensor ($\Delta T_E$), and linear curve fit for both.

Those having ordinary skill in the art will recognize that numerous modifications can be made to the specific implementations described above. The implementations should not be limited to the particular limitations described. Other external RTD sensor ($\Delta T_E$) were collected and compared in FIG. 10. Among the three cells in each group, the temperature rise agreed well with each other considering the slight difference in $LiCoO_2$ masses. So, the first order relation can be established between temperature rise and $LiCoO_2$ mass, and the fitted lines are shown in FIG. 10. Maximum deviation of $\Delta T$ from the predicted value from fitted first order relation was 1.2° C. This error was comparable with RTD measurement error in FIG. 4a. Thus, the internal RTD can provide a reliable measurement of electrode temperature in the extreme electrochemical environment of Li-ion battery short circuit.

Figure 11:
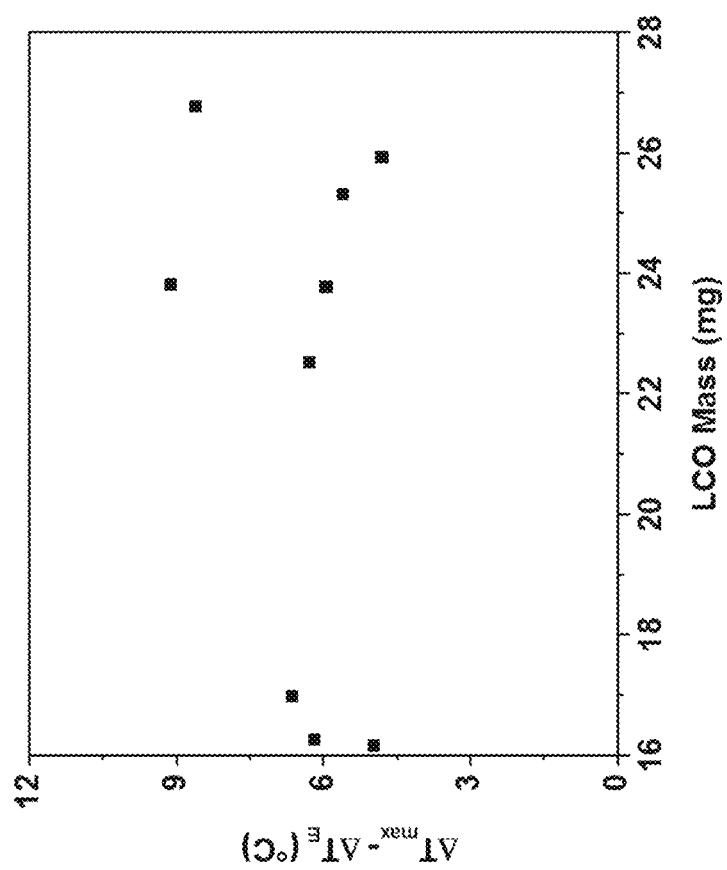
FIG. 11 is a graph of the difference of ΔT (shown as $\Delta T_{max}$) and $\Delta T_E$ of FIG. 10 in ° C. vs. LCO mass in mg.

Relation between $\Delta T_E$ and $\Delta T$ can be used for prediction of electrode temperature with simple external sensor-based measurement. From observation of FIG. 10, both $\Delta T$ and $\Delta T_E$ presented first order relation with $LiCoO_2$ mass. As the structure and components remained the same for all 9 cells, the slope were similar for both $\Delta T$-$LiCoO_2$ mass and $\Delta T_E$-$LiCoO_2$ mass relations. It is thus expected that the difference between internal and external RTD measurements is relatively independent of $LiCoO_2$ mass. In FIG. 11, difference between $\Delta T$ and $\Delta T_E$ is provided for difference $LiCoO_2$ mass when internal RTD detected the highest temperature increase $\Delta T$. The difference between $\Delta T$ and $\Delta T_E$ remained around 6.5° C., similar to observation in Table 2. This value can be used for prediction of electrode temperature when only external RTD is available.

Figure 12:
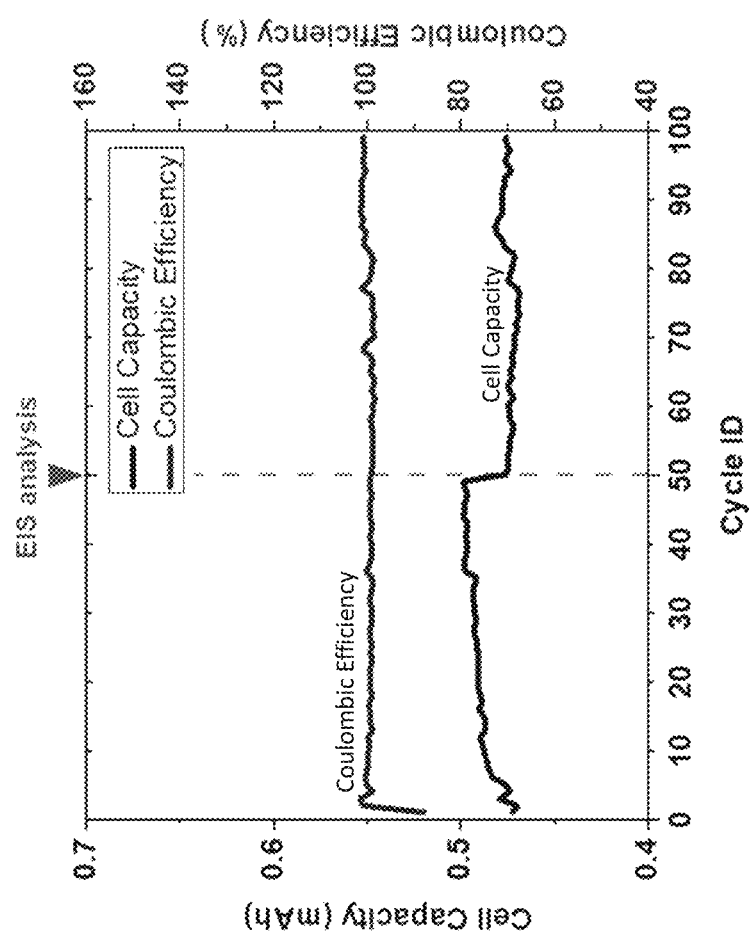
FIG. 12 is a graph of cell capacity in mAh and coulombic efficiency (%) vs. cycle ID (for 0-100 cycles).

To evaluate stability of RTD in Li-ion battery over extended service life, half-cell with graphite anode and internal RTD was constructed and cycled at rate of 0.25 C continuously. Electrochemical impedance spectroscopy analysis was completed on the cell after 50 cycles, and the cell was cycled to 100 cycles afterwards. Capacity and Coulombic efficiency over the whole 100 cycles are listed in FIG. 12. It can be found that the cell capacity remained steady except when electrochemical impedance spectroscopy analysis was done. The Coulombic efficiency of the cell remained close to 100% after few initial cycles. This indicates that the RTD embedded cell can be applied to extended service with no significant performance degradation or safety concern. Thermal safety analysis was conducted on multiple mode calorimetry to check heat evolution inside the coin cells with and without the presence of internal RTD sensor. Cells were heated from room temperature till 300° C. Heat evolution was compared in the region of exothermicity i.e. from 170° C. to 250° C. Heat evolved in cell with RTD sensor was lower compared to ordinary coin cell. This indicates that the incorporation of RTD temperature sensor in batteries increases the safety aspects for the batteries.

The invention claimed is:

1. A battery having an internally disposed thermal protection arrangement, comprising:
 a housing, wherein the housing comprises a positive cap and a negative cap that are electrically isolated from one another;
 a first electrode disposed in the housing;
 a second electrode disposed in the housing;
 a polymer porous separator disposed between the first electrode and the second electrode;
 an electrolyte disposed in the housing interspersed between the first electrode, the second electrode, and the polymer porous separator;
 at least one sensor holder having an electrode side and a housing side internally disposed within the housing, with at least one cavity provided on the electrode side;
 at least one current collector configured to be firmly attached to one of the first electrode or the second electrode; and
 at least one temperature sensor placed in the at least one cavity of the at least one sensor holder, the at least one cavity sized such that the outer surface of the at least one temperature sensor being flush with the remaining surface of the at least one sensor holder, and wherein the at least one temperature sensor has no contact with the polymer porous separator.

2. The battery of claim 1, wherein the first electrode is a negative electrode and the second electrode is a positive electrode.

3. The battery of claim 2, wherein the first electrode is a lithium foil and the second electrode is $LiCoO_2$.

4. The battery of claim 3, wherein the polymer porous separator is made from polypropylene.

5. The battery of claim 1, wherein the at least one current collector includes aluminum or alloys thereof.

6. The battery of claim 1, wherein the at least one current collector includes copper or alloys thereof.

7. The battery of claim 1, wherein the at least one temperature sensor is a resistance temperature detector (RTD)-based sensor.

8. The battery of claim 7, wherein during a short circuit event thermal detection range of the RTD-based sensor represents a ΔT between internal temperature and external temperature of between about 5° C. to about 10° C.

9. The battery of claim 8, wherein the RTD-based sensor is adapted to detect temperature rise between about 7 and about 10 times faster than a temperature rise detected by an external sensor.

10. The battery of claim 1, wherein the at least one temperature sensor is electrochemically inactive with the electrolyte.

* * * * *